US011442595B2

(12) United States Patent
Schulz

(10) Patent No.: US 11,442,595 B2
(45) Date of Patent: Sep. 13, 2022

(54) METHOD AND DEVICE FOR CONTROLLING THE SELECTION OF MEDIA FILES FOR PLAYBACK

(71) Applicant: VOLKSWAGEN AG, Wolfsburg (DE)

(72) Inventor: Robert Schulz, Schwülper (DE)

(73) Assignee: VOLKSWAGEN AG, Wolfsburg (DE)

( * ) Notice: Subject to any disclaimer, the term of this patent is extended or adjusted under 35 U.S.C. 154(b) by 613 days.

(21) Appl. No.: 15/123,607

(22) PCT Filed: Mar. 4, 2014

(86) PCT No.: PCT/EP2014/054137
§ 371 (c)(1),
(2) Date: Sep. 2, 2016

(87) PCT Pub. No.: WO2015/131928
PCT Pub. Date: Sep. 11, 2015

(65) Prior Publication Data
US 2017/0083176 A1    Mar. 23, 2017

(51) Int. Cl.
*G06F 3/0482*     (2013.01)
*G11B 19/02*     (2006.01)
(Continued)

(52) U.S. Cl.
CPC .......... *G06F 3/0482* (2013.01); *G06F 3/0488* (2013.01); *G06F 3/04842* (2013.01); *G06F 3/165* (2013.01); *G11B 19/025* (2013.01)

(58) Field of Classification Search
CPC ...... G06F 3/0482; G06F 3/0488; G06F 3/165; G06F 3/04842; G06F 2203/04806; G06F 2203/04808; G11B 19/025
See application file for complete search history.

(56) References Cited

U.S. PATENT DOCUMENTS 7,685,204 B2   3/2010 Rogers
7,844,915 B2   11/2010 Platzer et al.
(Continued)

FOREIGN PATENT DOCUMENTS

CN   101501629 A   8/2009
CN   102053783 A   5/2011
(Continued)

OTHER PUBLICATIONS

International Search Report, dated Oct. 30, 2014, issued in corresponding International Application No. PCT/EP2014/054137 (English-language translation).

(Continued)

*Primary Examiner* — Angie Badawi
(74) *Attorney, Agent, or Firm* — Hunton Andrews Kurth LLP

(57) ABSTRACT

In a method for controlling the selection of media files for playback, graphical objects are displayed, and each media file is assigned to one graphical object in each case. In addition, first probabilities, by which the media files are selected for playback, are indicated in the method via a feature of the graphical objects. An operating action by a user, by which the feature of at least one graphical object is modified, is detected. Moreover, second probabilities are assigned to the graphical objects as a function of the modification of the feature of the at least one graphical object. The media files are selected for replay as a function of the second probabilities. In addition, a device is arranged for controlling the selection of media files for replay purposes.

14 Claims, 5 Drawing Sheets

(51) Int. Cl.
*G06F 3/0488* (2022.01)
*G06F 3/16* (2006.01)
*G06F 3/04842* (2022.01)

(56) References Cited

U.S. PATENT DOCUMENTS

| | | |
|---|---|---|
| 8,054,300 B2 | 11/2011 | Bernstein |
| 2006/0265421 A1 | 11/2006 | Ranasinghe et al. |
| 2006/0288845 A1* | 12/2006 | Gale .................. G11B 27/105 84/609 |
| 2007/0088727 A1 | 4/2007 | Kindig |
| 2007/0256021 A1* | 11/2007 | Prager .................. G11B 27/034 715/744 |
| 2010/0131844 A1 | 5/2010 | Wohlert |
| 2011/0096087 A1 | 4/2011 | Chun |
| 2012/0050335 A1 | 3/2012 | Hou |
| 2012/0232681 A1 | 9/2012 | Mundy et al. |
| 2013/0055077 A1 | 2/2013 | Hagel-Sorensen |
| 2013/0083051 A1 | 4/2013 | Sigal |
| 2013/0152017 A1* | 6/2013 | Song .................. G06F 3/0482 715/811 |
| 2013/0235087 A1* | 9/2013 | Kashibuchi ............. G06T 11/60 345/660 |
| 2013/0328804 A1 | 12/2013 | Oshima et al. |
| 2014/0245148 A1* | 8/2014 | Silva .................. H04N 5/44591 715/719 |
| 2014/0344690 A1* | 11/2014 | Kuhn .................... G06F 3/0482 715/716 |
| 2017/0300212 A1* | 10/2017 | Vinna .................. G06F 3/04817 |

FOREIGN PATENT DOCUMENTS

| | | |
|---|---|---|
| CN | 102 662 601 | 9/2012 |
| CN | 104851439 A | 8/2015 |
| CN | 104978377 A | 10/2015 |
| DE | 102 43 505 | 4/2004 |
| DE | 20 2007 018 413 | 6/2008 |
| JP | 2013-254463 A | 12/2013 |
| WO | 2008/030976 | 3/2008 |
| WO | 2013/037476 A1 | 3/2013 |

OTHER PUBLICATIONS

International Preliminary Report on Patentability, dated Sep. 6, 2016, in International Application No. PCT/EP2014/054137. (English-language translation).

European Office Action mailed from the European Patent Office issued to corresponding EP Application No. 14711930.9 dated Apr. 4, 2020, 11 pages.

EP Communication issued from European Patent Office issued to EP Application No. 14711930.9 dated Apr. 7, 2022, 5 pages.

\* cited by examiner

| | P1 (%) | P2 (%) |
|---|---|---|
| 7.1 | 6,25 | 10,25 |
| 7.2 | 6,25 | 4,1 |
| 7.3 | 6,25 | 6,55 |
| 7.4 | 6,25 | 5,33 |
| 7.5 | 6,25 | 6,55 |
| 7.6 | 6,25 | 4,1 |
| 7.7 | 6,25 | 3,68 |
| 7.8 | 6,25 | 5,74 |
| 7.9 | 6,25 | 6,55 |
| 7.10 | 6,25 | 3,68 |
| 7.11 | 6,25 | 3,28 |
| 7.12 | 6,25 | 6,96 |
| 7.13 | 6,25 | 8,20 |
| 7.14 | 6,25 | 3,28 |
| 7.15 | 6,25 | 15,60 |
| 7.16 | 6,25 | 6,15 |

METHOD AND DEVICE FOR CONTROLLING THE SELECTION OF MEDIA FILES FOR PLAYBACK

FIELD OF THE INVENTION

The present invention relates to a method and a device for controlling the selection of media files for playback.

BACKGROUND INFORMATION

A user is generally unable to influence a sequence in a random playback of media files, e.g., audio or video files. The sequence is frequently determined by an algorithm for a random selection method. Such a random selection method is provided in what is commonly known as a shuffle functionality, for instance in media players. The probability that a media file will be selected for playback is generally the same for all media files, and the user basically has no possibility of influencing the selection probabilities. In conventional methods, the user preferences are recorded over time and preference degrees are automatically ascertained therefrom. However, the user has no direct influence on the playback probability of the data files and instead can influence it only indirectly.

In this context, German Published Patent Application No. 102 43 505 describes a method for the playback of data, in which a value, which represents the preference of the user for this data file, is stored together with each data file stored. The preference degree is ascertained automatically via the listening and viewing habits of the user. The more frequently a data file is viewed or listened to, the higher the value of the preference degree.

U.S. Pat. No. 7,685,204 likewise describes a method in which probabilities derived from the listening preferences of a user are assigned to the media files for a shuffle functionality.

U.S. Patent Application Publication No. 2012/0232681 describes a method in which a list of media files can be generated, which then is able to be played back in a random fashion.

The conventional methods and devices mentioned above have the disadvantage that the user can influence the playback sequence in a shuffle functionality only indirectly, via listening or viewing habits.

SUMMARY

Example embodiments of the present invention provide a method and a device that allow a user to influence the probability that a media file will be selected for playback in a direct, uncomplicated and intuitive manner.

In the method according to an example embodiment of the present invention, graphical objects are displayed, and each media file is assigned to one graphical object in each case. First probabilities, based on which the media files will be selected for playback, are indicated by a feature of the graphical objects. In addition, an operating action of a user, by which the feature of at least one graphical object is modified, is detected. Depending on the change in the feature of the at least one graphical object, second probabilities are assigned to the graphical objects. Finally, the media files are selected for playback as a function of the second probabilities. The operating action may enable a user to directly influence the probability that a media file will be played back. The user is thereby able to assign a higher playback probability to new media files in a shuffle functionality than to older media files, especially if his or her listening habits have changed.

Prior to the operating action, the feature of the graphical objects in particular is the same for all graphical objects, so that each media file is selected for playback on the basis of the same first probability. The feature of the at least one graphical object is modified by the operating action. Following the operating action, the media file to which the at least one graphical object is assigned has a higher/lower second probability as a function of the operating action, while other media files, especially all other media files, have correspondingly lower/greater second probabilities. That is to say, if the first probability of the media files assigned to the at least one graphical object is increased by the operating action, other media files, in particularly all other media files, have a lower, second probability. If the first probability of the media files assigned to the at least one graphical object is reduced by the operating action, then other media files, in particular all other media files, have a higher, second probability. For example, the second probabilities for the other media files are automatically adapted to the second probability of the media file that is assigned to the at least one graphical object after the operating action.

The feature may be the size of the graphical objects, and the first probability of the media file assigned to the at least one graphical object is increased/decreased by enlarging/reducing the at least one graphical object. The first probability thus is increased by enlarging the at least one graphical object, and the first probability of the associated media file is decreased by reducing the at least one graphical object. The size is a feature of a graphical object that is particularly easy to manipulate. For example, it corresponds to the area of the graphical object on the display. As an alternative, the color of the graphical object could also represent the feature.

The operating action may be a gesture of the user on a display area having a touch-sensitive surface. This makes the method particularly easy to carry out. In particular, the method then is able to be executed on conventional smartphones or tablet computers, which are usually equipped with touch-sensitive screens.

In particular, the at least one graphical object is selected whereas the other graphical objects are not selected. The touch-sensitive surface is touched in at least two points, and the selected graphical object is enlarged/reduced by enlarging/decreasing the distance between the two points. This corresponds especially to a so-called "pinch-in" gesture in an enlargement of the graphical object and a so-called "pinch-out" gesture in a reduction of the graphical object. It is a gesture that is usually known to the user from zooming actions. This simple gesture, which is also intuitive for modifying the size of an object, is therefore considered to be especially advantageous for the method described herein. Furthermore, the user merely needs to select the graphical object at the beginning, and the operating action can then take place in a random area of the touch-sensitive surface.

The selected, at least one graphical object may have a boundary, and the at least two points preferably lie within the boundary of the selected at least one graphical object. That is to say, the operating action is executed directly on the graphical object, which is especially intuitive for the user.

The sizes of the non-selected graphical objects may be reduced/enlarged according to the enlargement/reduction of the size of the selected at least one graphical object. Depending on whether a graphical object thus is enlarged in order to increase the first probability, or is decreased in order to reduce the first probability, the graphical objects that are not selected will then be displayed in a correspondingly reduced or enlarged size. In other words, the user receives immediate feedback about the effects an increase in or a reduction of the first probability of the media file assigned to the selected graphical object has on the first probabilities of the other media files.

The feature of the at least one graphical object may correlate with the second probability in a linear fashion, which allows a rapid and uncomplicated determination of the second probability. A side length, a diagonal or an area of the graphical object may be used for ascertaining the size of the graphical object.

The media files and their first and/or second probabilities may be identified in a list in which the media files having the greatest first and/or second probability are shown in first place. The first and/or second probabilities are indicated as numerical values, in particular. This makes it possible for the user to orientate himself not only based on the feature of the graphical objects, but the user is able to adjust the probability in a precise manner. In addition, it is clearly shown to the user which media file has the greatest probability of being selected and played back. This is considered to be advantageous in particular when the probabilities of two media files are so close that the sizes of the graphical objects to which they are assigned are no longer able to be distinguished visually.

The first and/or the second probability of a media file may be the probability that the media file will be selected next for playback from among the set of media files. This in particular allows direct influencing of the probability of a media file of a set of media files that is enumerated for random playback in a list. The playback sequence within a shuffle functionality may thus no longer be completely random, but this is intentional since the user himself has influenced the probabilities.

The media files may be music titles, and the graphical objects may be representations of the album covers of the respective music titles. This means that the playback of a music collection within a shuffle functionality can be influenced in this manner. As an alternative, the media files may also be video data files, whose playback sequence is influenced by the user.

The method is executed in a vehicle, in particular, because an operation of an infotainment system while driving should be realizable via simple and intuitive operating actions. The reason for this is that the driver should be distracted from the traffic situation as little as possible while operating an infotainment system.

Example embodiments of the present invention provide a device for controlling a selection of media files for playback. The device includes a display device on which graphical objects are able to be displayed, each media file being assignable to one graphical object. In addition, the device includes a control unit by which the display device is actuable such that first probabilities, on the basis of which the media files are selectable for playback, can be displayed via a feature of the graphical objects. The device furthermore includes a detection device, which can detect an operating action of a user, by which the feature of at least one graphical object is able to be modified. Moreover, the device includes a computing unit, by which second probabilities can be assigned to the media files as a function of the change in the feature of the at least one graphical object, the media files being selectable as a function off the second probabilities. Also included is a playback device by which the selected media files are able to be played back. The device may be suitable for executing the method described herein and therefore provides all of the advantages of the method.

The detection device may include a touch-sensitive surface disposed on a display area of the display device. This makes it possible to detect and execute the operating action on the display area of the display device in an uncomplicated and intuitive manner. As an alternative, the device also has a proximity and/or gesture detection device. The operating action can thus be executed in a space in front of the display surface without touching the touch-sensitive surface.

The device may include a media system in which all media files are stored. The media system may be part of the device or be coupled with the device via an interface.

The device is disposed in an interior space of a vehicle, in particular.

Furthermore, example embodiments of the present invention provide a vehicle that includes a device described herein.

Further features and aspects of example embodiments of the present invention are described in more detail below with reference to the Figures.

DETAILED DESCRIPTION

Figure 1:
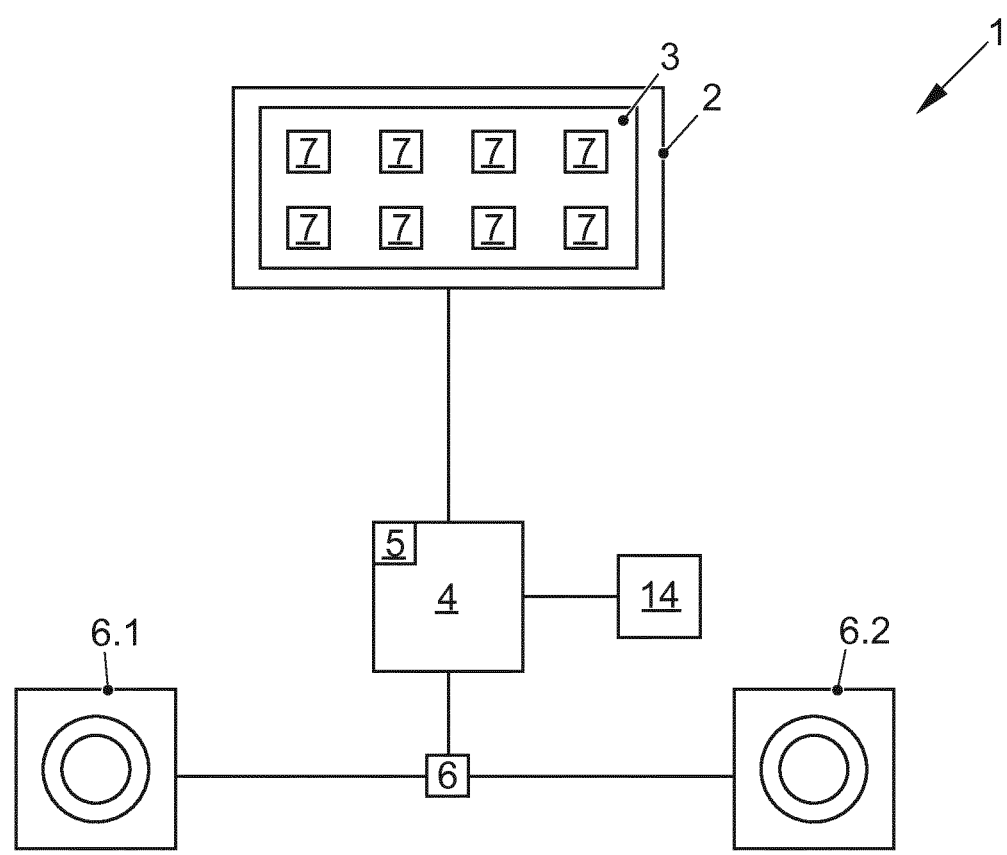
FIG. 1 shows a device according to an example embodiment of the present invention.

A device 1 according to an example embodiment of the present invention will be discussed with reference to FIG. 1.

Device 1 includes a display device 2. The display area of display device 2 includes a touch-sensitive surface and is used as detection device 3. In the following text, the touch-sensitive surface as detection device 3 is indicated by reference numeral 3.

Multiple graphical objects 7 are able to be displayed on the display area of display device 2. Graphical objects 7 are generated on the display area as a function of the media files stored in a media system 14.

Graphical objects 7 have a feature S, which is modifiable via operating actions of a user on touch-sensitive surface 3 of display device 2. Feature S of graphical objects 7 is their size, in particular. As an alternative, feature S of graphical objects 7 may also be their color. Feature S in particular correlates with a second probability P2 of the media files that the user can adjust on touch-sensitive surface 3 via an operating action.

Device 1 furthermore includes a control unit 4. Control unit 4 is coupled with display device 2 and is able to control it. A computing unit 5 is integrated into control unit 4. Using feature S of graphical objects 7, that is to say, their size, control unit 5 is able to ascertain first probabilities P1 prior to the operating action, and second probabilities P2, by which the media files assigned to graphical objects 7 are selected for playback, even during or following the operating action.

In this particular example, the media files are music titles. Graphical objects 7, for example, are album covers representing the music titles. For instance, all media files or a sub-set are/is displayed on the display area by assigned graphical objects 7.

In addition, device 1 includes a playback device 6, which in this particular example is arranged as a music playback device equipped with loudspeakers 6.1 and 6.2. Using playback device 6, a media file then is selected for playback based on first P1 or second probabilities P2 ascertained by computing unit 5, and finally played back.

Display device 2 provided with touch-sensitive surface 3, control unit 4, computing unit 5 and playback device 6 with loudspeakers 6.1 and 6.2 may be components of a smartphone or a tablet computer, in particular.

A first exemplary embodiment of the method will be explained with reference to FIGS. 2a through 2c, 3 and 4.

As the starting situation, graphical objects 7.1 through 7.16 are displayed on the display area. The user activates a functionality by which the media files are played back at random, i.e., a so-called shuffle functionality. A first probability P1, based on which the media files assigned to graphical objects 7.1 through 7.16 are selected for playback, is assigned to the media files at the outset. All first probabilities P1 are the same at the start of the method. This is indicated to the user in that all graphical objects 7.1 through 7.16 have the same size S. In the case of sixteen media files, each media file is assigned a first probability P1 of 6.25%.

In this particular example, the user wishes to assign a second probability P2 to the media files. The procedure is explained for graphical object 7.15 by way of example. It is the user's intention, for instance, to assign a higher second probability P2 to the media file allocated to graphical object 7.15. To do so, the user touches graphical object 7.15 at two points 10.1 and 10.2 from a certain distance A. Point 10.1 is touched by his right index finger 9.1, and point 10.2 by his right thumb 9.2. The user then enlarges distance A by spreading his thumb 9.2 and his index finger 9.1 apart. This operating action is detected by the touch-sensitive surface, i.e., detection device 3, for instance. It transmits a signal to computing unit 5, in which first probabilities P1 that have been assigned to the media files via size S of graphical objects 7.1 through 7.16 are stored. Computing unit 5 continually ascertains a second probability P2 in the process.

Figures 3, 4:
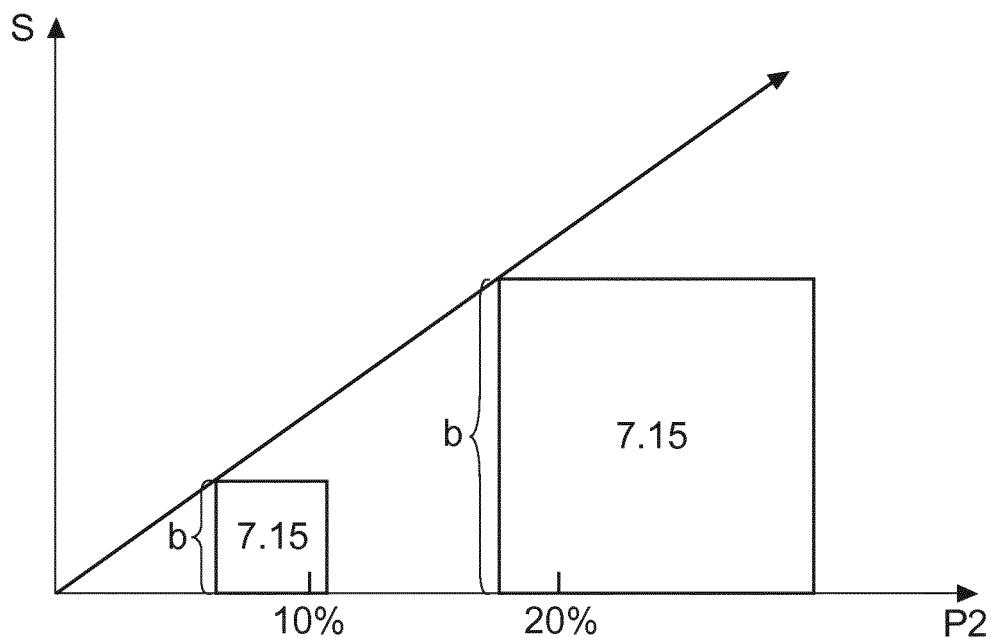
FIG. 3 shows an example of a correlation between the size of a graphical object and the probability.
FIG. 4 shows a table with exemplary first probabilities prior to the operating action and second probabilities following the operating action.

FIG. 3 shows the relationship between size S of graphical objects 7.1 through 7.16 and second probability P2 by way of example for graphical object 7.15. The relationship may be a linear correlation, probability P2 being plotted on the x-axis and size S of graphical object 7.15 being plotted on the y-axis. Side length b of graphical object 7.15 is used for measuring size S of graphical object 7.15. The larger b is, the greater second probability P2 assigned to graphical object 7.15 will be.

Size S of graphical object 7.15 at the end of the operating action defines second probability P2 that is ultimately assigned to the media file allocated to graphical object 7.15. The gesture by which graphical object 7.15 is enlarged is also referred to as "pinch-in" gesture. It is also used in zooming operations, in particular, and therefore especially intuitive.

If the user wishes to reduce first probability P1, he will reduce distance A between the two contact points 10.1 and 10.2 by moving his index finger 9.1 and thumb 9.2 toward each other. This gesture is also known as a "pinch-out" gesture and is as intuitive as the "pinch-in" gesture.

Figure 2A:
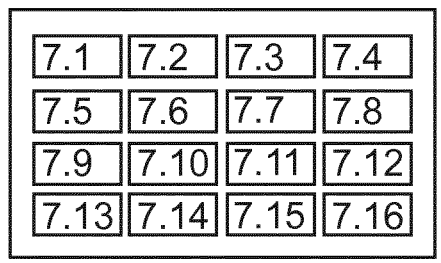
FIGS. 2a to 2c show displays which are generated by a method according to an example embodiment of the present invention.
Figure 2B:
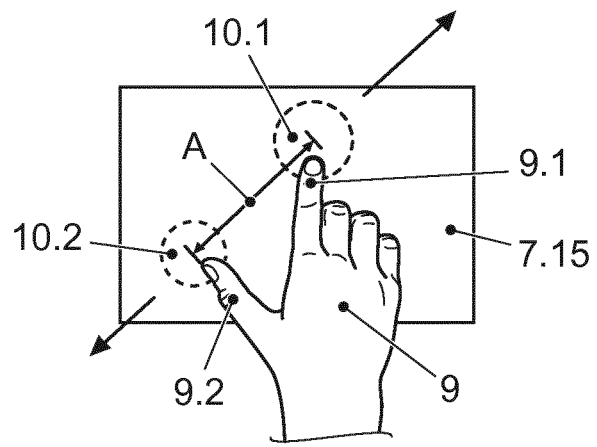
Figure 2C:
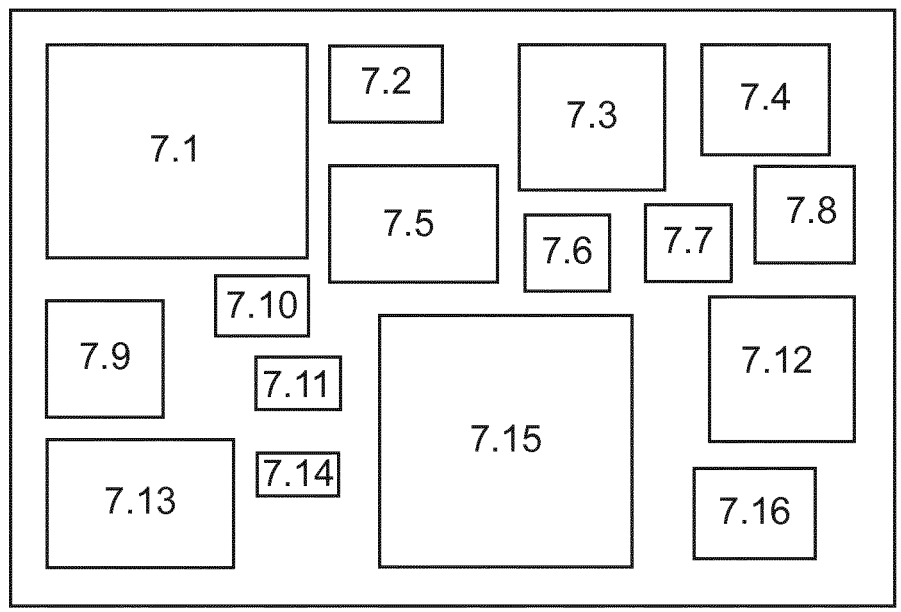

In this particular example, the user assigns a second probability P2 to each media file using a "pinch-in" or a "pinch-out" gesture. The end result is shown in FIG. 2c. Using the operating action described in the preceding text, a second probability P2 has been assigned to each graphical object 7.1 through 7.16. Second probabilities P2 are illustrated in FIG. 4 by way of example. This makes it clear that the media file assigned to graphical object 7.15 now has the highest second probability P2 of being selected and played back from among the set of media files. Second probabilities P2 are stored in computing unit 5 and used as first probabilities P1 in a new start-up of device 1.

As an alternative, a control element by which the user is able to reset all probabilities P2 to the same value again is shown on the display area.

Figure 5:
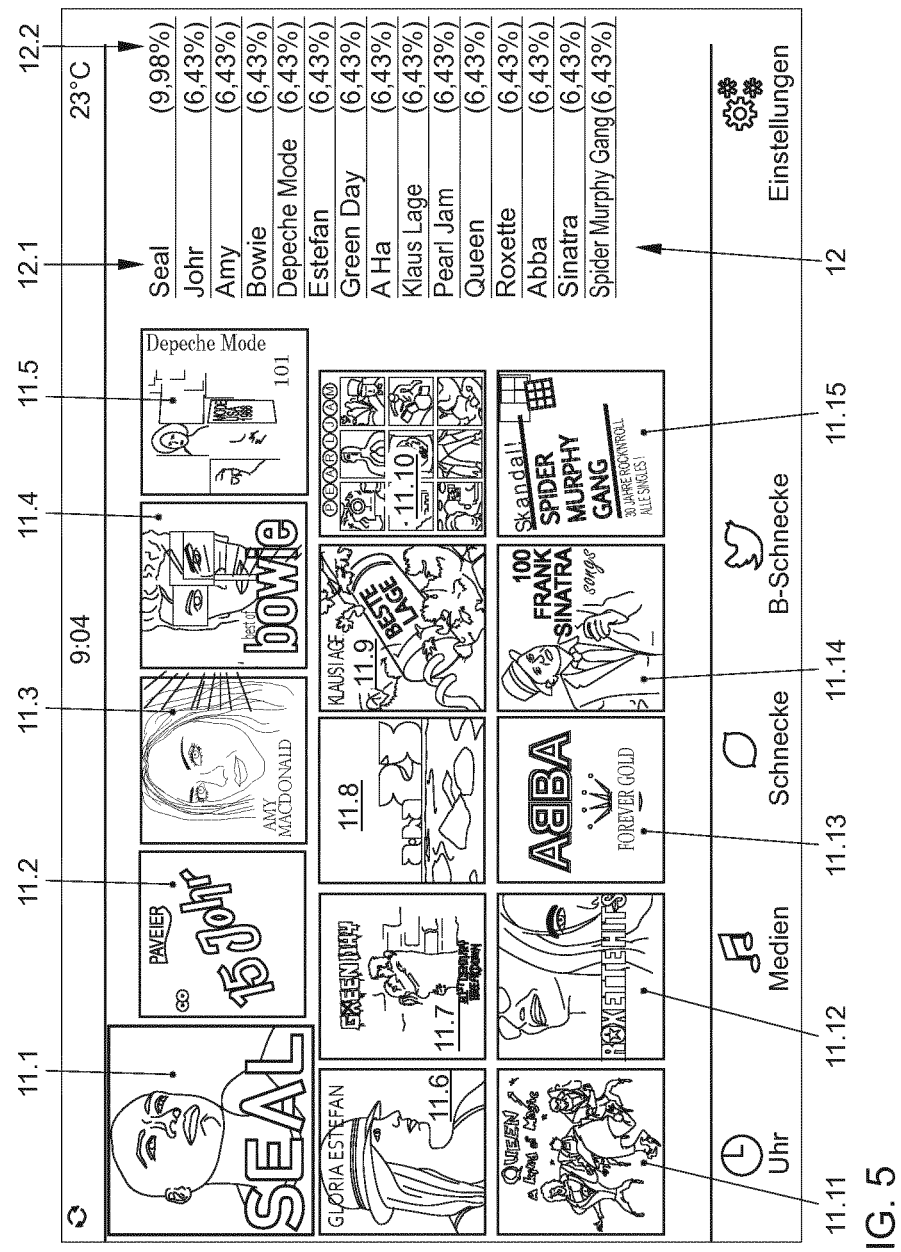
FIG. 5 shows a display on the display area, which is generated by a method according to an example embodiment of the present invention.

A second exemplary embodiment of the method is explained with reference to FIG. 5.

The media files are music albums, i.e., no longer individual music titles, and the shuffle functionality then randomly selects an album from which all music titles are then played back in sequence. As an alternative, however, the individual music titles within the albums can be assigned second probabilities P2. A new album then will be selected randomly again only when all music titles from the selected music album have been played back. If the user wants to prevent the playback of a music title of an album, then the user assigns the second probability of zero to the graphical object allocated to the music title. In this case the corresponding graphical object may be displayed in dimmed form.

In the starting situation of the second exemplary embodiment, only fifteen graphical objects 11.1 through 11.15 are displayed on the display area. Graphical objects 11.1 through 11.15 have the same size. Given fifteen media files in a media system 14, probability P1 of being selected and played back is approximately 6.66% for each media file. At the start of the method, graphical objects 11.1 through 11.15 have same size S. This indicates to the user that all media files have the same first probability P1 of being selected and played back. In addition, the names of all performers of the music albums are displayed in a list 12 that is shown next to graphical objects 11.1 through 11.15, as well as the numerical values of first probabilities P1 that a music album will be selected next. At the start of the method, the numerical value of 6.66% will therefore be displayed in column 12.2 of list 12 for each performer.

The user now wishes to increase first probability P1 of only one media file, e.g., the music album that is assigned to graphical object 11.1. To do so, the user touches graphical object 11.1 and thereby selects it. Then, the "pinch-in" gesture is executed in a random area of touch-sensitive surface 3. This may be advantageous if the method is carried out in a vehicle 8, especially when driving on uneven roads, where the user has a hard time keeping his hand in one place.

Simultaneously with the enlargement of graphical object 11.1, the numerical value of the probability changes in column 12.2 of list 12. This gives the user not only a visual impression of the probability change, but also provides a probability change expressed numerically. At the same time, the numerical values of all other media files are adapted as well because if first probability P1 of a media file is increased, first probabilities P1 of all other media files decrease to the same degree, as well.

That is to say, if first probability P1 of the media file assigned to graphical object 11.1 is increased from 6.66% to 9.98%, first probabilities P1 of the other media files are automatically reduced from 6.66% to second probability P2 of 6.43%. In order to ensure that all graphical objects 11.1 through 11.15 can still be accommodated on the display area despite the enlargement of graphical object 11.1, graphical objects 11.14 and 11.15 situated in the bottom row may be shifted to the right in the display area, yet the sizes of graphical objects 11.1 through 11.12, 11.14 and 11.15 remain unchanged in all other respects. The display in the display area following the operating action is shown in FIG. 5.

As an alternative, it is also possible to reduce the sizes of graphical objects 11.1 through 11.12, 11.14 and 11.15 to the same extent.

The first and the second exemplary embodiment of the method are combinable as desired. For example, the gesture may be performed in any region of the display area in the first exemplary embodiment as well, or on graphical object 11.1 in the second exemplary embodiment.

Figure 6:
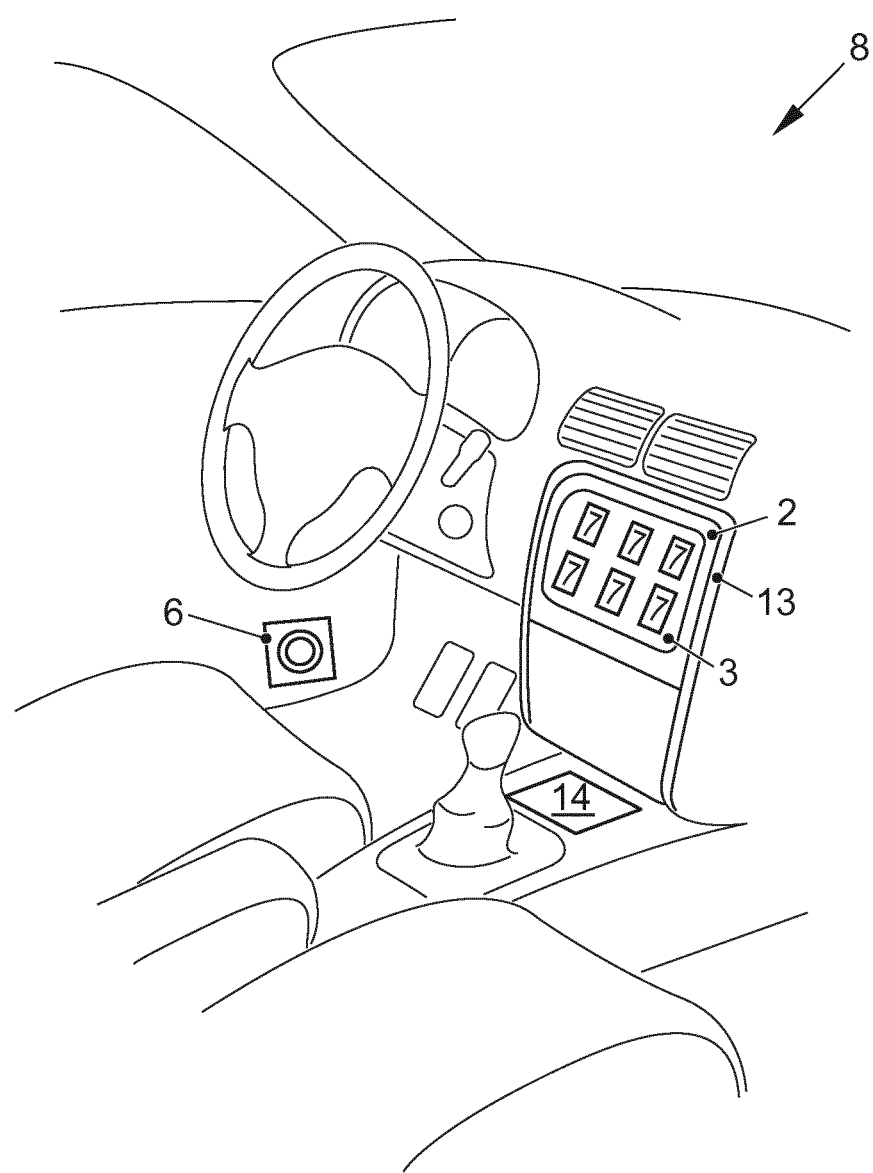
FIG. 6 shows an example of the positioning of the device according to an example embodiment of the present invention inside a vehicle.

FIG. 6 shows a vehicle 8 including a device 1 as explained in FIG. 1. Display device 2 having the touch-sensitive surface as detection device 3 is disposed in center console 13 of vehicle 8. Media system 14 may either be installed in vehicle 8 itself or be connected from the outside via an interface. For example, a media system 14 may be an MP-3 player, a smartphone or a tablet computer. Playback device 6 could either be part of vehicle 8 or also connected externally or linked with vehicle 8. If the playback device is connected externally or linked with vehicle 8, then it could likewise be an MP3 player, a smartphone or a tablet computer. Nevertheless, it is still possible in particular to use loudspeakers 6.1 and 6.2 of vehicle 8 for the playback operation.

LIST OF REFERENCE CHARACTERS 1 device
2 display device
3 detection device; touch-sensitive surface
4 control unit
5 computing unit
6 playback device
6.1, 6.2 loudspeaker
7 graphical objects
7.1-7.16 graphical objects
8 vehicle
9 hand
9.1 thumb
9.2 index finger
10.1, 10.2 contact points
11.1-11.15 graphical objects
12 list
12.1, 12.2 columns of the list
13 center console
14 media system
A space between the contact points
b side length of the graphical objects
P1 first probability
P2 second probability
S feature of the graphical objects, size of the graphical objects

The invention claimed is:

1. A method for controlling selection of media files for playback comprising:

displaying graphical objects, a single media file being assigned to each of the graphical objects;
indicating first probabilities by a feature of the graphical objects;
detecting an operating action of a user, by which the feature of at least one graphical object is modified;
assigning second probabilities to the graphical objects as a function of the modification of the feature of the at least one graphical object; wherein the feature of the at least one graphical object correlates linearly with the second probabilities; and
selecting the media files for playback as a function of the second probabilities during a shuffle functionality;
wherein the first and second probabilities are the probabilities that the media files assigned to the graphical objects are played during a shuffle functionality.

2. The method according to claim 1, wherein the feature of the graphical objects is the same for all graphical objects prior to the operating action, so that each media file is selected for playback based on the same first probability, the feature of the at least one graphical object is modified by the operating action, and following the operating action, the media file to which the one graphical object is assigned has a higher/lower second probability as a function of the operating action, whereas other media files have a correspondingly lower/greater second probability.

3. The method according to claim 1, wherein the feature includes a size of the graphical objects, and the first probability of the media file assigned to the at least one graphical object is increased or decreased by enlarging or reducing the at least one graphical object.

4. The method according to claim 1, wherein the operating action includes a gesture of the user on a display area having a touch-sensitive surface.

5. The method according to claim 4, wherein the at least one graphical object is selected while other graphical objects are not selected, and the touch-sensitive surface is touched in at least two points, and the selected graphical object is enlarged or reduced in that a distance between the two points is enlarged or reduced.

6. The method according to claim 5, wherein the selected at least one graphical object has a boundary, and the at least two points lie within the boundary of the selected at least one graphical object.

7. The method according to claim 5, wherein a size of the non-selected graphical objects are reduced or enlarged in accordance with the enlargement or reduction of a size of the selected at least one graphical object.

8. The method according to claim 1, wherein the media files and the first and/or second probabilities are displayed in a list, and the media file having a greatest first and/or second probability is displayed in first place on the list.

9. The method according to claim 1, wherein the media files include music titles, and the graphical objects includes representations of album covers of the music titles.

10. A device for controlling selection of media files for playback, comprising:

a display device adapted to display graphical objects, a single media file being assignable to each of the graphical objects;
a control unit coupled to the display device and adapted to actuate the display device such that first probabilities are displayable by a feature of the graphical objects;
a detection device adapted to detect an operating action of a user, the feature of at least one graphical object being modifiable by the operating action;

a computing unit integrated into the control unit and adapted to assign second probabilities to the media files as a function of the modification of the feature of the at least one graphical object, the media files being selectable with the aid of the control unit as a function of the second probabilities; wherein the feature of the at least one graphical object correlates linearly with the second probabilities; and a playback device adapted to play back selected media files of one of the first or second probabilities during a shuffle functionality;

wherein the first and second probabilities are the probabilities that the media files assigned to the graphical objects are played during a shuffle functionality.

11. The device according to claim 10, wherein the detection device includes a touch-sensitive area on a display surface of the display device.

12. The device according to claim 10, wherein the device includes a media system adapted to store the media files.

13. The device according to claim 10, wherein the device is arranged in an interior space of a vehicle.

14. A vehicle, comprising the device as recited in claim 10.

\* \* \* \* \*